United States Patent
Choi et al.

(10) Patent No.: US 9,946,114 B2
(45) Date of Patent: Apr. 17, 2018

(54) DISPLAY DEVICE AND MANUFACTURING METHOD THEREOF

(71) Applicant: Samsung Display Co., Ltd., Yongin-si, Gyeonggi-Do (KR)

(72) Inventors: Sang Gun Choi, Suwon-si (KR); Seung-Yeon Chae, Hwaseong-si (KR); Tae Woon Cha, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 60 days.

(21) Appl. No.: 14/792,364

(22) Filed: Jul. 6, 2015

(65) Prior Publication Data

US 2016/0147094 A1 May 26, 2016

(30) Foreign Application Priority Data

Nov. 20, 2014 (KR) ........................ 10-2014-0162430

(51) Int. Cl.
*G02F 1/1339* (2006.01)
*G02F 1/1337* (2006.01)
*G02F 1/1333* (2006.01)

(52) U.S. Cl.
CPC .......... *G02F 1/1337* (2013.01); *G02F 1/1339* (2013.01); *G02F 2001/133388* (2013.01)

(58) Field of Classification Search
CPC ............. G02F 1/1337; G02F 1/133345; G02F 1/1339; G02F 2001/133388
USPC ................................................ 349/153–154
See application file for complete search history.

(56) References Cited

U.S. PATENT DOCUMENTS

| | | | |
|---|---|---|---|
| 7,154,578 B2 * | 12/2006 | Kim ...................... | G02F 1/1339 349/138 |
| 2006/0132033 A1 * | 6/2006 | Maeda .................... | H01L 51/56 313/512 |
| 2008/0129946 A1 * | 6/2008 | Chan ...................... | G02F 1/1339 349/153 |
| 2012/0075559 A1 * | 3/2012 | Sonoda ................. | G02F 1/1339 349/110 |
| 2014/0167053 A1 * | 6/2014 | Akiyoshi ............ | H01L 27/1262 257/59 |
| 2014/0320789 A1 * | 10/2014 | Son ....................... | G02F 1/1337 349/123 |
| 2015/0002801 A1 | 1/2015 | Kim | |

FOREIGN PATENT DOCUMENTS

| | | |
|---|---|---|
| JP | 2013080184 A | 5/2013 |
| KR | 1020050033293 A | 4/2005 |
| KR | 1020120127621 A | 11/2012 |
| WO | 2011155133 A1 | 12/2011 |

* cited by examiner

Primary Examiner — Charles Chang
(74) Attorney, Agent, or Firm — H.C. Park & Associates, PLC

(57) ABSTRACT

A display device includes: a display substrate including a display area including a plurality of pixel areas and a non-display area at edge sides of the display area; and an aligning agent-accommodating structure including a capping layer disposed in the non-display area to be opened inward of the display substrate. The aligning agent-accommodating structure accommodates an aligning agent applied to the display area.

19 Claims, 15 Drawing Sheets

DISPLAY DEVICE AND MANUFACTURING METHOD THEREOF

CLAIM OF PRIORITY

This application makes reference to, incorporates the same herein, and claims all benefits accruing under 35 U.S.C. § 119 from an application earlier filed in the Korean Intellectual Property Office on 20 Nov. 2014 and there duly assigned Serial No. 10-2014-0162430.

BACKGROUND OF THE INVENTION

1. Field of Disclosure

Embodiments of the present invention relate to a display device and a manufacturing method thereof, and more particularly, to a display device having a narrow bezel and a manufacturing method thereof.

2. Description of the Related Art

Display devices such as a liquid crystal display (LCD) device, an organic light emitting diode (OLED) display device, and the like are being widely used.

Such display devices include a plurality of gate and data lines that are connected to a plurality of pixels.

The plurality of pixels are formed at points where the gate lines and the data lines cross.

When a gate signal of a gate-on voltage is sequentially applied to the plurality of gate lines, a data signal is applied to the plurality of data lines in response to the gate signal of the gate-on voltage to write image data to the plurality of pixels.

The LCD consists of two sheets of display panels in which electrodes are formed, and a liquid crystal layer interposed therebetween. The LCD displays an image by generating an electric field on the liquid crystal layer by applying a voltage to the field generating electrodes, determining alignment directions of liquid crystal molecules of the liquid crystal layer by the generated field, and controlling polarization of incident light.

An alignment layer is used to align the liquid crystal molecules in a predetermined direction.

An aligning agent such as a polyimide or the like is coated on the display panel and is then heat-treated and rubbed to form an alignment layer.

Recently, a display device having a narrow bezel where a bezel area is minimized has been developed.

For example, a display device with a very narrow bezel having a width of about 0.5 mm has been developed.

When the width of the bezel is narrowed, the aligning agent is likely to flow onto the bezel when the aligning agent is coated on the display panel.

In this case, adhesiveness of a sealing member formed in the bezel to seal and bond the two sheets of display panels may deteriorate, thereby causing the sealing member to be detached or the aligning agent to leak to generate edge stains.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a display device having a narrow bezel and a manufacturing method thereof.

A display device according to an exemplary embodiment of the present invention includes: a display substrate including a display area including a plurality of pixel areas and a non-display area disposed at edge sides of the display area; and an aligning agent-accommodating structure including a capping layer disposed in the non-display area to be opened inward of the display substrate. The aligning agent-accommodating structure accommodates an aligning agent applied to the display area.

The aligning agent-accommodating structure may include: a first insulating layer disposed on the display substrate; and a second insulating layer spaced apart from the display substrate to interpose a gap therebetween.

The second insulating layer may form an aligning agent-accommodating entrance that is opened toward the display area.

A facing substrate facing the display substrate may be further included, and the aligning agent-accommodating structure may include a first aligning agent-accommodating structure disposed on the display substrate and a second aligning agent-accommodating structure disposed on the facing substrate.

A sealing member disposed between the first and second aligning agent-accommodating structures may be further included.

At least either one of the first and second aligning agent-accommodating structures may be provided in a plural number to be arranged in one line along the non-display area.

A facing substrate facing the display substrate may be further included, and the aligning agent-accommodating structure may be disposed on either one of the display substrate and the facing substrate.

An aligning agent-blocking dam disposed on the other one of the display substrate and the facing substrate to face the aligning agent-accommodating structure may be further included.

The aligning agent-blocking dam may be extended along the non-display area.

A sealing member disposed between the aligning agent-accommodating structure and the aligning agent-blocking dam may be further included.

The aligning agent-accommodating structure may be provided in a plural number to be arranged in a plurality of columns along the non-display area.

The aligning agent-accommodating structure may include: a first aligning agent-accommodating structure disposed at the outermost side; and a second aligning agent-accommodating structure not disposed at the outermost side.

The first aligning agent-accommodating structure may have a spatial structure having an aligning agent-accommodating entrance opened toward the display area.

The second aligning agent-accommodating structure may have a spatial structure having an aligning agent-accommodating entrance opened toward the display area and an aligning agent-accommodating outlet opened toward the first aligning agent-accommodating structure.

The aligning agent-accommodating structure may include at least one support portion for supporting the capping layer.

A manufacturing method of a display device according to another exemplary embodiment of the present invention includes steps of: forming, in a display substrate including a display area including a plurality of pixels and a non-display area at edge sides of the display area, a sacrificial layer in the non-display area; forming a capping layer on the sacrificial layer; forming an aligning agent-accommodating entrance in the capping layer to partially expose the sacrificial layer; and forming a gap between the display substrate and the capping layer by removing the sacrificial layer.

Forming a bottom layer on the display substrate before forming the sacrificial layer may be further included.

Forming a photosensitive film pattern for forming the aligning agent-accommodating entrance on the capping layer may be further included.

The capping layer may be partially removed through an etching process using the photosensitive film pattern as a mask to form the aligning agent-accommodating entrance.

The sacrificial layer may include a hole for forming a support portion for supporting the capping layer.

In the display device having the narrow bezel, adhesiveness of the sealing member can be improved.

Accordingly, the display device having the narrow bezel may address problems such as edge stains or the like caused by sealing and bonding defects.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE INVENTION

Figure 1:
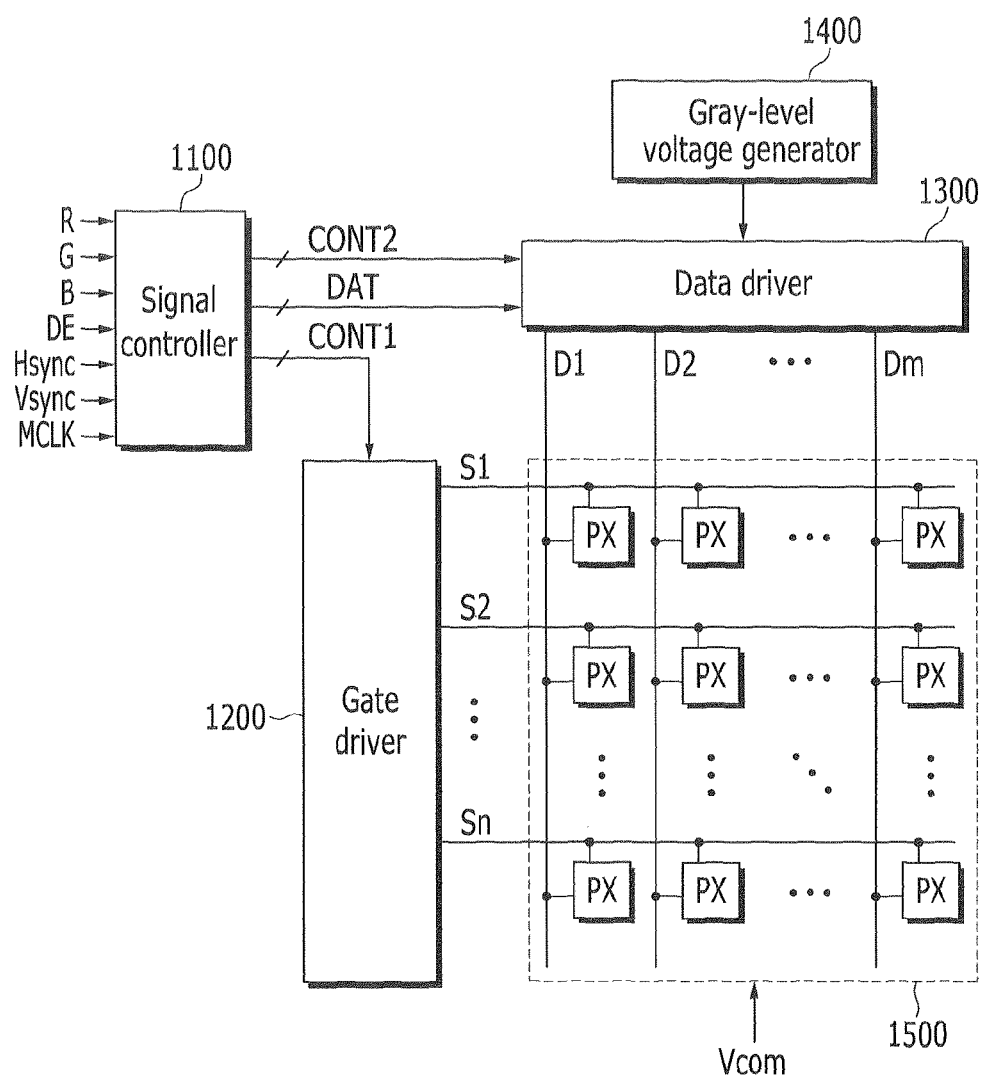
FIG. 1 is a block diagram of a display device according to an exemplary embodiment of the present invention.

The present invention will be described more fully hereinafter with reference to the accompanying drawings, in which exemplary embodiments of the invention are shown.

As those skilled in the art would realize, the described embodiments may be modified in various different ways, all without departing from the spirit or scope of the present invention.

Further, in the exemplary embodiments, since like reference numerals designate like elements having the same configuration, a first exemplary embodiment is representatively described, and in other exemplary embodiments, only different configurations from the first exemplary embodiment will be described.

Parts that are irrelevant to the description will be omitted to clearly describe the present invention, and the same or similar constituent elements will be designated by the same reference numerals throughout the specification.

In the drawings, the thickness of layers, films, panels, regions, etc. are exaggerated for clarity.

Like reference numerals designate like elements throughout the specification.

It will be understood that when an element such as a layer, film, region, or substrate is referred to as being "on" another element, it can be directly on the other element or intervening elements may also be present.

In contrast, when an element is referred to as being "directly on" another element, there are no intervening elements present.

In addition, when it is described that an element is "coupled" to another element, the element may be "directly coupled" to the other element or "electrically coupled" to the other element through a third element.

Further, unless explicitly described to the contrary, the word "comprise" and variations such as "comprises" or "comprising" will be understood to imply the inclusion of stated elements but not the exclusion of any other elements.

FIG. 1 is a block diagram of a display device according to an exemplary embodiment of the present invention.

In reference to FIG. 1, the display device includes a signal controller 1100, a gate driver 1200, a data driver 1300, a gray-level voltage generator 1400, and a liquid crystal panel assembly 1500.

The liquid crystal panel assembly 1500 includes a plurality of gate lines S1 to Sn, a plurality of data lines D1 to Dm, and a plurality of pixels PX.

The plurality of pixels PX are arranged in an approximate matrix form while being connected to the plurality of gate lines S1 to Sn and the plurality of data lines D1 to Dm.

The plurality of gate lines S1 to Sn substantially extend in a row direction such that they are nearly parallel to each other.

The plurality of data lines D1 to Dm substantially extend in a column direction such that they are nearly parallel to each other.

Herein, only the plurality of gate and data lines S1 to Sn and D1 to Dm are illustrated to be connected to the plurality of pixels PX, but various signal lines such as a power supply line, a divided reference voltage line, and the like may be additionally connected to the plurality of pixels PX depending on structures of the pixels PX, a driving method, and the like.

Meanwhile, backlights (not shown) may be provided at a rear side of the liquid crystal panel assembly 1500 to control luminance of an image that is displayed on the liquid crystal panel assembly 1500.

The backlights emit light to the liquid crystal panel assembly 1500.

The signal controller 1100 receives image signals R, G, and B and an input control signal.

The image signals R, G, and B contain luminance information about the plurality of pixels.

Luminance has a predetermined number of gray levels, for example, $1024=2^{10}$, $256=2^8$, or $64=2^6$ gray levels.

The input control signal includes a data enable signal DE, a horizontal synchronization signal Hsync, a vertical synchronization signal Vsync, and a main clock signal MCLK.

The signal controller 1100 generates a gate control signal CONT1, a data control signal CONT2, and an image data signal DAT according to the image signal R, G, and B, the data enable signal DE, the horizontal synchronizing signal Hsync, the vertical synchronization signal Vsync, and the main clock signal MCLK.

The signal controller 1100 identifies the image signals R, G, and B for each frame according to the vertical synchronization signal Vsync and for each gate line according to the horizontal synchronization signal Hsync, thereby generating the image data signal DAT.

The signal controller 1100 may provide the image data signal DAT and the data control signal CONT2 to the data driver 1300.

As a signal for controlling an operation of the data driver 1300, the data control signal CONT2 includes a horizontal synchronization start signal STH for instructing a transmission start of the image data signal DAT, a load signal LOAD for instructing the data lines D1 to Dm to output a data signal, and a data clock signal HCLK.

The data control signal CONT2 may further include a reverse signal RVS for reversing a voltage polarity of the image data signal DAT with respect to a common voltage Vcom.

The signal controller 1100 provides the gate control signal CONT1 to the gate driver 1200.

The gate control signal CONT1 includes at least one clock signal for controlling output of a scanning start signal STV and a gate-on voltage of the gate driver 1200.

The gate control signal CONT1 may further include an output enable signal OE for limiting duration of the gate-on voltage.

The data driver 1300 is connected to the data lines D1 to Dm of the liquid crystal panel assembly 1500, and selects gray-level voltages from the gray-level voltage generator 1400.

The data driver 1300 applies the selected gray-level voltage as the data signal to the data lines D1 to Dm.

The gray-level voltage generator 1400 does not provide voltages for all gray levels, but provides only a predetermined number of reference gray-level voltages.

In this case, the data driver 1300 may divide the reference gray-level voltages to generate the gray-level voltages for all the gray levels, and may select the data signal among them.

The gate driver 1200 applies a gate signal, which consists of a gate-on voltage and a gate-off voltage for respectively turning the switching elements connected to the gate lines S1 to Sn of the liquid crystal panel assembly 1500 on and off, to the gate lines S1 to Sn.

The signal controller 1100, the gate driver 1200, the data driver 1300, and the gray-level voltage generator 1400 that are described above may be directly mounted on the liquid crystal panel assembly 1500 or on a flexible printed circuit film (not shown) as at least one IC chip, or may be attached to the liquid crystal panel assembly 1500 or mounted on a printed circuit board (PCB) (not shown) as a tape carrier package (TCP).

Alternatively, the signal controller 1100, the gate driver 1200, the data driver 1300, and the gray-level voltage generator 1400 may be integrated into the liquid crystal panel assembly 1500 along with the signal lines S1 to Sn and D1 to Dm.

Figure 2:
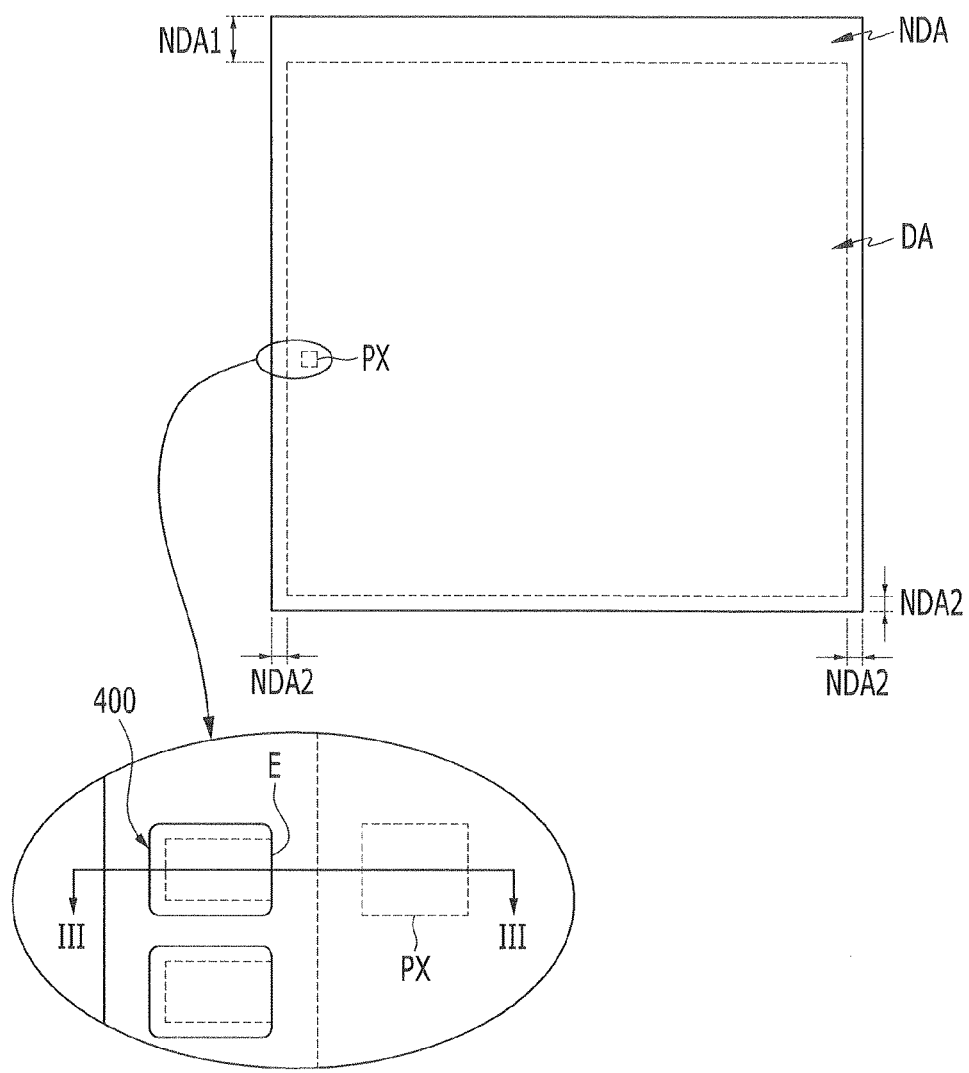
FIG. 2 is a top plan view of a display area and a non-display area of the display device according to the exemplary embodiment of the present invention.

FIG. 2 is a top plan view of a display area and a non-display area of the display device according to the exemplary embodiment of the present invention.

In reference to FIG. 2, the liquid crystal panel assembly 1500 includes a display area DA including the plurality of pixels PX and a non-display area NDA at edge sides of the display area DA.

That is, the liquid crystal panel assembly 1500 may be divided into the display area DA where an image is displayed and the non-display area NDA corresponding to a bezel by the plurality of pixels PX.

The non-display area NDA may include a first non-display area NDA1 and a second non-display area NDA2.

As an area corresponding to one edge side of the liquid crystal panel assembly 1500, the first non-display area NDA1 is relatively wider than the second non-display area NDA2.

The gate driver 1200, the data driver 1300, and the like that are described above in FIG. 1 may be disposed in the first non-display area NDA1 as an integrated circuit (IC) chip.

The second non-display area NDA2 is relatively narrower than the first non-display area NDA1, corresponding to a narrow bezel.

The second non-display area NDA2 may be an area corresponding to the other three edge sides of the liquid crystal panel assembly 1500.

A width of the second non-display area NDA2 may be less than about 0.5 mm.

The second non-display area NDA2 includes an aligning agent-accommodating structure 400.

The aligning agent-accommodating structure 400 may be provided in a plural number to be arranged in one line along the second non-display area NDA2.

The aligning agent-accommodating structure 400 has a cavity structure having an aligning agent-accommodating entrance E that is opened toward the display area DA.

In a manufacturing process of the liquid crystal panel assembly 1500, the aligning agent-accommodating structure 400 accommodates an aligning agent flowing into the second non-display area NDA2 when the aligning agent is coated on the display area DA.

In this case, a structure in which the plurality of aligning agent-accommodating structures 400 are provided to be arranged in one line along the second non-display area NDA is illustrated, but a single aligning agent-accommodating structure 400 may be formed to extend along one edge side of the liquid crystal panel assembly 1500.

Hereinafter, in reference to FIG. 3, in the display device according to the exemplary embodiment of the present invention, a structure of the pixel PX disposed in the display area DA and a structure of the aligning agent-accommodating structure 400 disposed in the second non-display area NDA2 will be described in detail.

Figure 3:
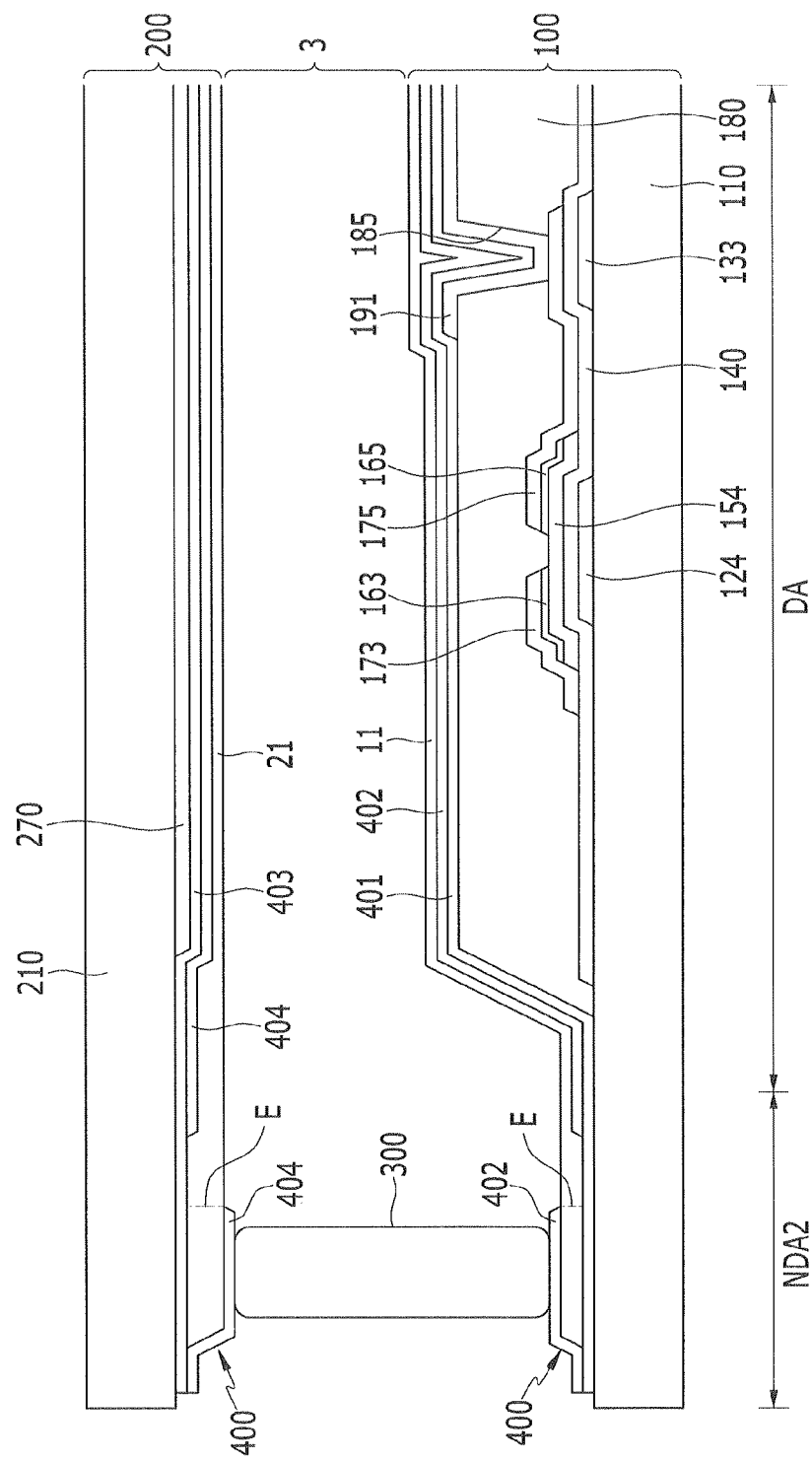
FIG. 3 is a cross-sectional view of FIG. 2 taken along the line III-III.

FIG. 3 is a cross-sectional view of FIG. 2 taken along the line III-III.

In reference to FIG. 3, the liquid crystal panel assembly 1500 includes lower and upper panels 100 and 200 facing each other, and a liquid crystal layer 3 interposed between the lower and upper panels 100 and 200.

The upper panel 200 may be referred to as a facing substrate that faces the lower panel 100.

In the display area DA, the lower panel 100 will be described first.

In the lower panel 100, a gate line and a storage line are formed on a first substrate 110 that is formed of transparent glass, plastic, or the like.

The gate line transmits a gate signal and mainly extends in a horizontal direction, and includes a gate electrode 124 that protrudes from the gate line.

The storage electrode line is applied with a predetermined voltage, and mainly extends in the horizontal direction.

Each storage electrode line includes a storage electrode 133 that extends from the storage electrode line.

A gate insulating layer 140 is disposed on the gate electrode 124 and the storage electrode 133.

The gate insulating layer 140 may be formed of a silicon oxide ($SiO_x$), a silicon nitride ($SiN_x$), or the like.

The gate insulating layer 140 may have a multilayer structure in which at least two insulating layers having different physical properties are included.

A semiconductor 154 is disposed on the gate insulating layer 140.

The semiconductor 154 may be formed of hydrogenated amorphous silicon, crystalline silicon, or the like.

The semiconductor 154 may include an oxide semiconductor.

Ohmic contacts 163 and 165 facing each other are paired to be disposed on the semiconductor 154.

The ohmic contacts 163 and 165 may be formed of a material such as n+ hydrogenated amorphous silicon in which an n-type impurity such as phosphor is doped at a high concentration, or of a silicide.

The ohmic contacts 163 and 165 may be paired to be disposed on the semiconductor 154.

The ohmic contacts 163 and 165 may be omitted if the semiconductor 154 is the oxide semiconductor.

A data line having a source electrode 173 and a drain electrode 175 is disposed on the ohmic contacts 163 and 165 and the gate insulating layer 140.

The data line transmits a data voltage and mainly extends in a vertical direction to cross the gate line.

The drain electrode 175 faces the source electrode 173 based on the gate electrode 124.

One gate electrode 124, one source electrode 173, and one drain electrode 175 form one thin film transistor (TFT) along with the semiconductor 154, and a channel of the TFT is formed between the semiconductor 154 between the source electrode 173 and the drain electrode 175.

The source electrode 173 and the drain electrode 175 may be preferably formed of a refractory metal such as molybdenum, chromium, tantalum, and titanium, etc., or an alloy thereof, and may have a multilayer structure including a refractory metal layer (not shown) and a low-resistance conductive layer (not shown).

An example of the multilayer structure may be a double layer of a chromium or molybdenum (alloy) lower layer and an aluminum (alloy) upper layer, or a triple layer of a molybdenum (alloy) lower layer, an aluminum (alloy) middle layer, and a molybdenum (alloy) upper layer.

However, in addition to those described above, the source electrode 173 and the drain electrode 175 may be formed of various metals or conductors.

A passivation layer 180 is formed on the source electrode 173, the drain electrode 175, and the exposed semiconductor 154.

The passivation layer 180 may be formed of an inorganic insulator such as a silicon nitride or a silicon oxide, an organic insulator, or a low dielectric insulating material having a dielectric constant of less than 4.0.

The passivation layer 180 includes a contact hole 185 that exposes the drain electrode 175.

A pixel electrode 191 is formed on the passivation layer 180.

The pixel electrode 191 is formed of a transparent conductive material such as ITO, IZO, etc., and is electrically connected to the drain electrode 175 through the contact hole 185.

A first insulating layer 401 and a second insulating layer 402 are sequentially disposed on the pixel electrode 191 and the passivation layer 180.

The first insulating layer 401 may be omitted.

A first alignment layer 11 is formed on the second insulating layer 402.

Next, in the display area DA, the upper panel 200 will be described.

The upper panel 200 includes a second substrate 210, and a common electrode 270 that is disposed on the second substrate 210 to face the lower panel 100.

The common electrode 270 has a planar shape, and may be formed as a plate on the entire substrate 110.

The common electrode 270 may be formed of a transparent conductive material such as ITO, IZO, etc.

In this case, a configuration in which the common electrode 270 is disposed in the upper panel 200 has been described, but the common electrode 270 may be disposed on the lower panel 100.

A third insulating layer 403 and a fourth insulating layer 404 are sequentially disposed on the common electrode 270.

The third insulating layer 403 may be omitted.

A second alignment layer 21 is formed on the fourth insulating layer 404.

Hereinafter, in the second non-display area NDA2, the lower panel 100 and the upper panel 200 will be described.

In the lower panel 100, the first insulating layer 401 is disposed on the first substrate 110.

The first insulating layer 401 may be omitted.

The second insulating layer 402 is disposed on the first insulating layer 401.

A capping layer is formed by the second insulating layer 402 such that it is spaced apart from the first substrate 110 to interpose a gap therebetween.

The second insulating layer 402 for forming the capping layer forms an aligning agent-accommodating entrance E that is opened toward the display area DA.

The first and second insulating layers 401 and 402 form the aligning agent-accommodating structure 400 of the lower panel 100 in the second non-display area NDA2.

The aligning agent-accommodating structure 400 has a cavity structure having the aligning agent-accommodating entrance E that is opened toward the display area DA.

One side of the aligning agent-accommodating structure 400 is closed, which is farther from the display area DA.

That is, the aligning agent-accommodating structure 400 is opened inward of the lower panel 100.

In the upper panel 200, the third insulating layer 403 is disposed on the second substrate 210.

The third insulating layer 403 may be omitted.

The fourth insulating layer 404 is disposed on the third insulating layer 403.

The capping layer is formed by the fourth insulating layer 404 such that it is spaced apart from the second substrate 210 to interpose a gap therebetween.

The fourth insulating layer 404 for forming the capping layer forms an aligning agent-accommodating entrance E that is opened toward the display area DA.

The third and fourth insulating layers 403 and 404 form the aligning agent-accommodating structure 400 of the lower panel 100 in the second non-display area NDA2.

That is, the aligning agent-accommodating structure 400 is opened inward of the upper panel 200.

In the manufacturing process of the liquid crystal panel assembly 1500, when an aligning agent is coated on the display area DA, the aligning agent-accommodating structure 400 accommodates the aligning agent flowing into the second non-display area NDA2.

In this case, the aligning agent does not flow over the aligning agent-accommodating structure 400, that is, over the second insulating layer 402 and the fourth insulating layer 404.

That is, the alignment layers 11 and 21 are not formed on the aligning agent-accommodating structures 400.

In the second non-display area NDA2, a sealing member 300 is disposed between the second insulating layer 402 of the lower panel 100 and the fourth insulating layer 404 of the upper panel 200.

That is, the sealing member 300 is disposed between the aligning agent-accommodating structure 400 of the lower panel 100 and the aligning agent-accommodating structure 400 of the upper panel 200.

The sealing member 300 is disposed to be extended along the non-display area NDA, bonds the lower and upper panels 100, 200, and seals inside of the liquid crystal panel assembly 1500.

Since the aligning agent does not flow over the aligning agent-accommodating structures 400 and thus the alignment layers 11 and 21 are not formed, adhesiveness of the sealing member 300 is prevented from decreasing by the aligning agent.

In addition, when the plurality of aligning agent-accommodating structures 400 are disposed along the second non-display area NDA2, a contact area between the second insulating layer 402 and the sealing member 300 increases and a contact area between the fourth insulating layer 404 and the sealing member 300 increases, thereby improving the adhesiveness of the sealing member 300.

A method of forming aligning agent-accommodating structures 400 in a second non-display area NDA2 of a display device will now be described with reference to FIGS. 4 through 9.

For ease of description, the method of forming the aligning agent-accommodating structure 400 in a lower panel 100 will be described.

The aligning agent-accommodating structure 400 of an upper panel 200 can be formed by using the same method.

FIGS. 4 through 9 are cross-sectional views for illustrating a manufacturing method of a display device according to an exemplary embodiment of the present invention.

Figure 4:
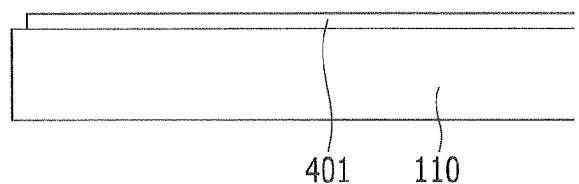
FIGS. 4 to 9 are cross-sectional views for illustrating a manufacturing method of a display device according to an exemplary embodiment of the present invention.

In reference to FIG. 4, a first insulating layer 401 is formed on a first substrate 110 in a non-display area NDA2.

The first insulating layer 401 may be formed in a display area DA and the second non-display area NDA2 after a thin film transistor, a passivation layer 180, a pixel electrode 191, etc. of the display area DA are formed.

The first insulating layer 401 may be a bottom layer of the aligning agent-accommodating structure 400.

A process of forming the first insulating layer 401 may be omitted.

Figure 5:
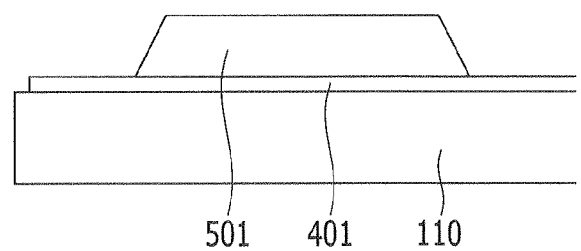

In reference to FIG. 5, a sacrificial layer 501 is formed in the second non-display area NDA2.

The sacrificial layer 501 may be formed by coating a photoresist on the first insulating layer 401 and then performing a photolithography process.

When the first insulating layer 401 is omitted, the sacrificial layer 501 may be formed by coating the photoresist on the first substrate 110 and then performing a photolithography process.

Figure 6:
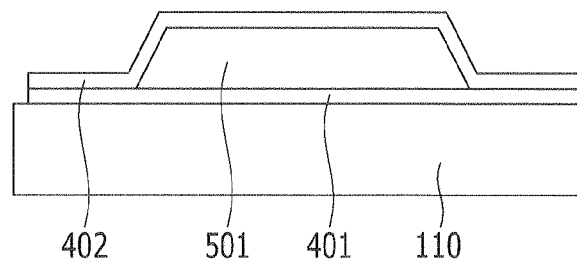

In reference to FIG. 6, after the sacrificial layer 501 is formed, a second insulating layer 402 is formed in the display area DA and the second non-display area NDA2.

The second insulating layer 402 may be a capping layer of the aligning agent-accommodating structure 400.

An inorganic insulating material such as a silicon oxide ($SiO_x$), a silicon nitride ($SiN_x$), etc. may be used to form the first and second insulating layers 401 and 402.

Alternatively, various kinds of organic insulating materials may be used to form the first and second insulating layers 401 and 402.

Figure 7:
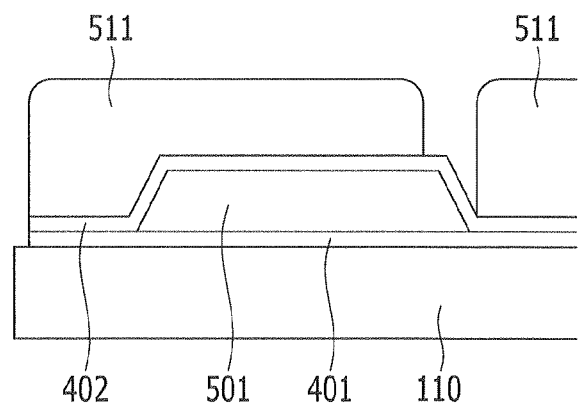

In reference to FIG. 7, after the second insulating layer 402 is formed, a photosensitive film pattern 511 for forming an aligning agent-accommodating entrance E is formed on the second insulating layer 402.

The photosensitive film pattern 511 may be formed by coating the photoresist on the second insulating layer 402 and then performing a photolithography process.

The photosensitive film pattern 511 is formed to partially expose the second insulating layer 402 where the aligning agent-accommodating entrance E is formed.

Figure 8:
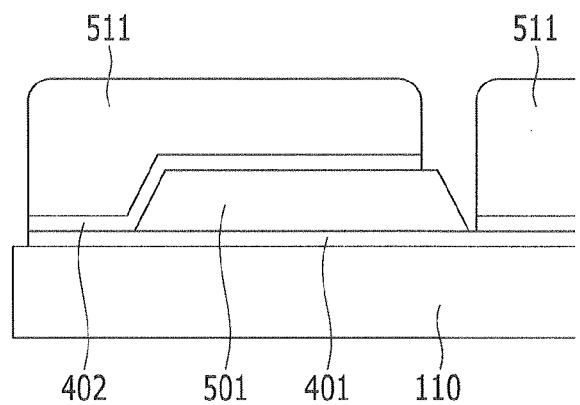

In reference to FIG. 8, the second insulating layer 402 is etched by an etching process using the photosensitive film pattern 511 as a mask to be exposed.

The exposed second insulating layer 402 may be etched to be removed, thereby forming the aligning agent-accommodating entrance E.

Figure 9:
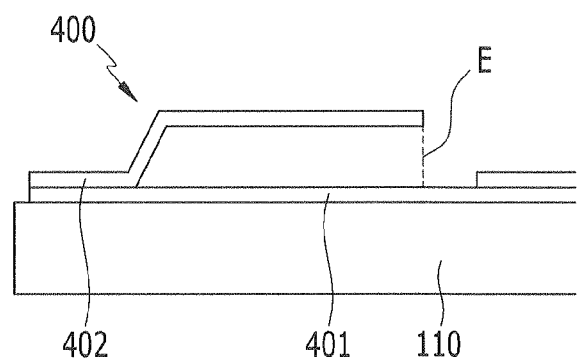

In reference to FIG. 9, the photosensitive film pattern 511 and the sacrificial layer 501 are removed by using a photoresist strip method.

Accordingly, the aligning agent-accommodating structure 400 having the aligning agent-accommodating entrance E is formed.

Figure 10:
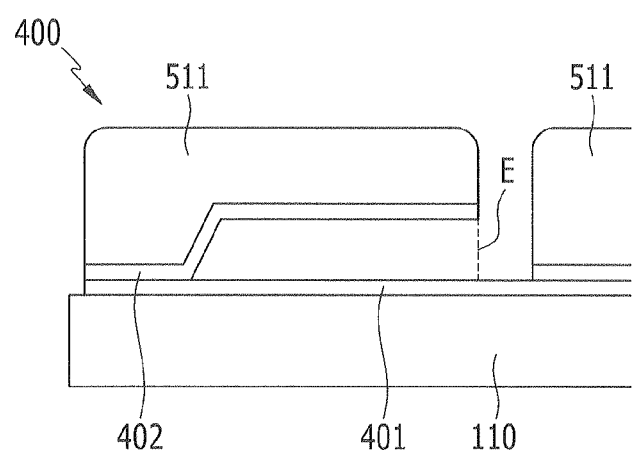
FIG. 10 is a cross-sectional view of an aligning agent-accommodating structure according to another exemplary embodiment of the present invention.

FIG. 10 is a cross-sectional view of an aligning agent-accommodating structure according to another exemplary embodiment of the present invention.

Differences between FIG. 10 and FIG. 9 will be described.

In reference to FIG. 10, the aligning agent-accommodating structure 400 further includes an organic layer on a second insulating layer 402.

In a process of forming the aligning agent-accommodating structure, a photosensitive organic material may be used as a photosensitive film pattern 511.

The photosensitive organic material remains since it is not removed by using a photoresist strip method.

Accordingly, the photosensitive film pattern 511 of the organic material may be an organic layer of the aligning agent-accommodating structure 400.

The organic layer is filled between a plurality of aligning agent-accommodating structures 400 to prevent an aligning agent from flowing therebetween and to prevent adhesiveness of a sealing member 300 from decreasing by the aligning agent between the plurality of aligning agent-accommodating structures 400.

In addition, the organic layer can more stably support the aligning agent-accommodating structures 400 to improve structural stability of aligning agent-accommodating structures 400.

Figure 11:
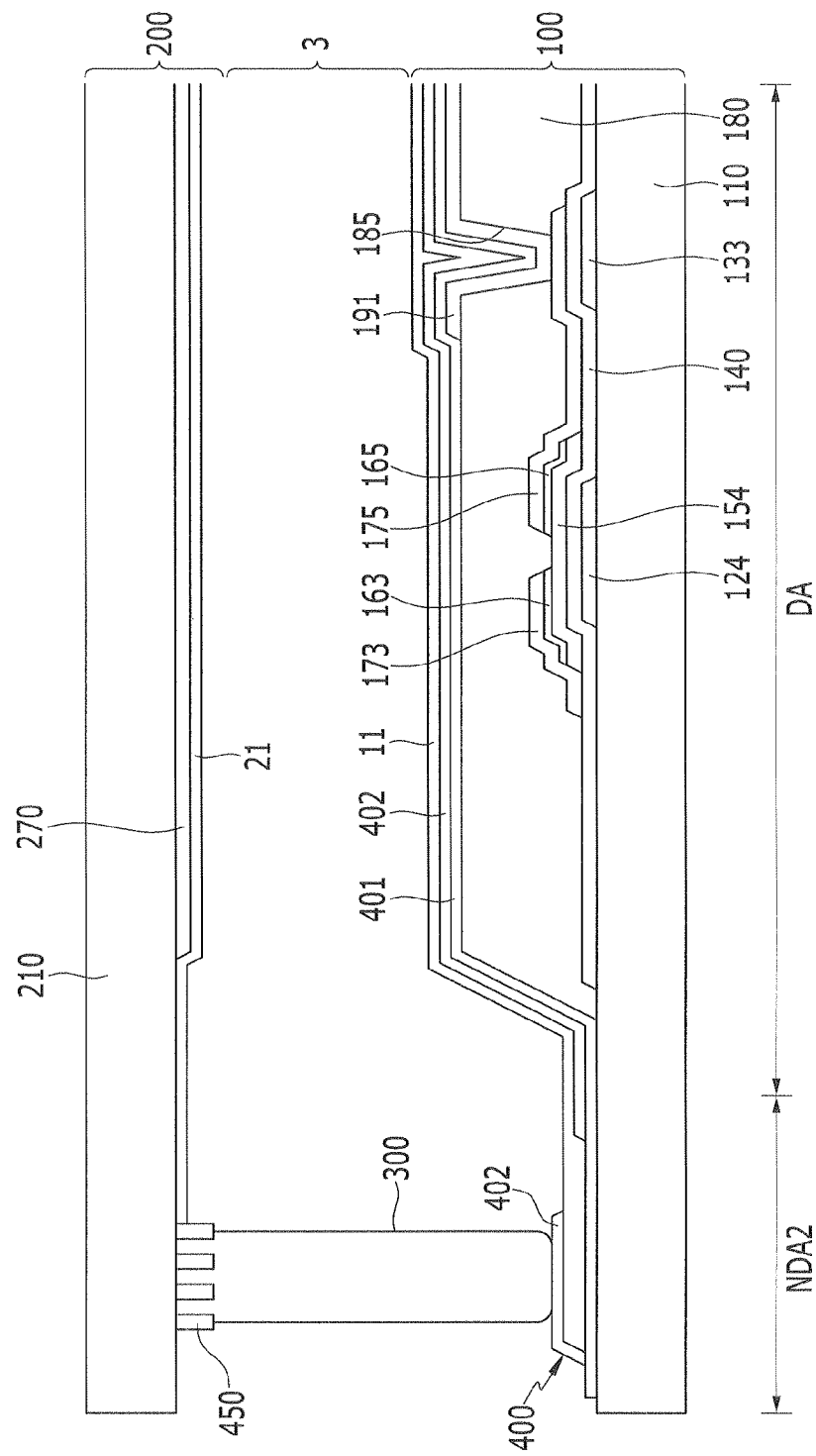
FIG. 11 is a cross-sectional view of a display device according to another exemplary embodiment of the present invention.

FIG. 11 is a cross-sectional view of a display device according to another exemplary embodiment of the present invention.

Differences between FIG. 11 and FIG. 3 will be described.

In reference to FIG. 11, in a second non-display area NDA2 of an upper panel 200, an aligning agent-accommodating structure 400 is not formed, while an aligning agent-blocking dam 450 is formed.

The aligning agent-blocking dam 450 faces the aligning agent-accommodating structure 400 of the lower panel 100.

The aligning agent-blocking dam 450 is extended along the second non-display area NDA2.

The aligning agent-blocking dam 450 prevents an aligning agent coated on the display area DA from flowing into the second non-display area NDA2.

A sealing member 300 is disposed between the aligning agent-accommodating structure 400 of the lower panel 100 and the aligning agent-blocking dam 450 of the upper panel 200, bonds the lower and upper panels 100 and 200, and seals inside of the liquid crystal panel assembly 1500.

In this case, a configuration in which the aligning agent-blocking dam 450 is formed in the upper panel 200 has been described, but a configuration in which the aligning agent-blocking dam 450 is formed in the lower panel 100 and the aligning agent-accommodating structure 400 is formed in the upper panel 200 may also be possible.

Figure 12:
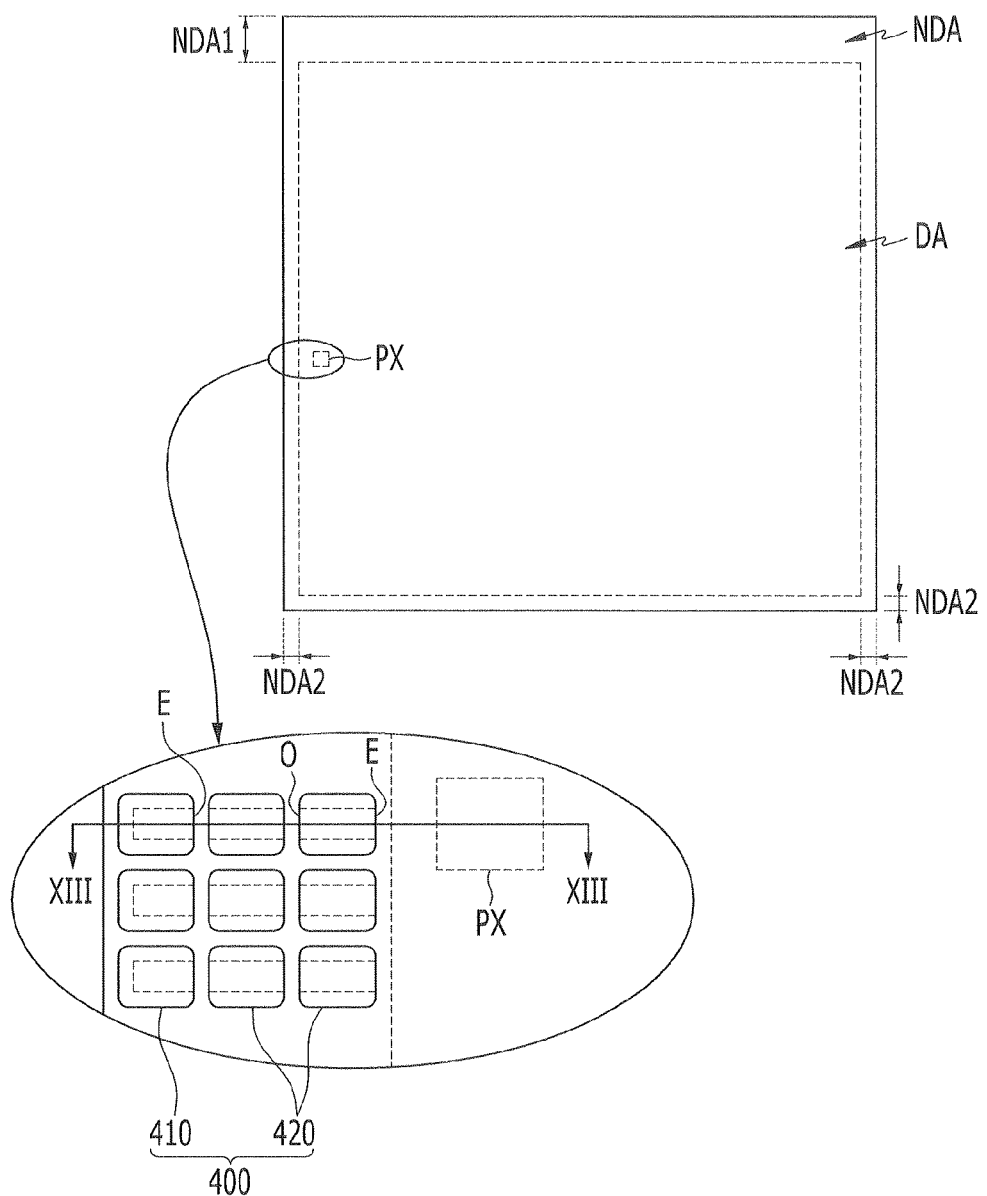
FIG. 12 is a top plan view of a display area and a non-display area of the display device according to another exemplary embodiment of the present invention.

FIG. 12 is a top plan view of a display area and a non-display area of the display device according to another exemplary embodiment of the present invention.

Figure 13:
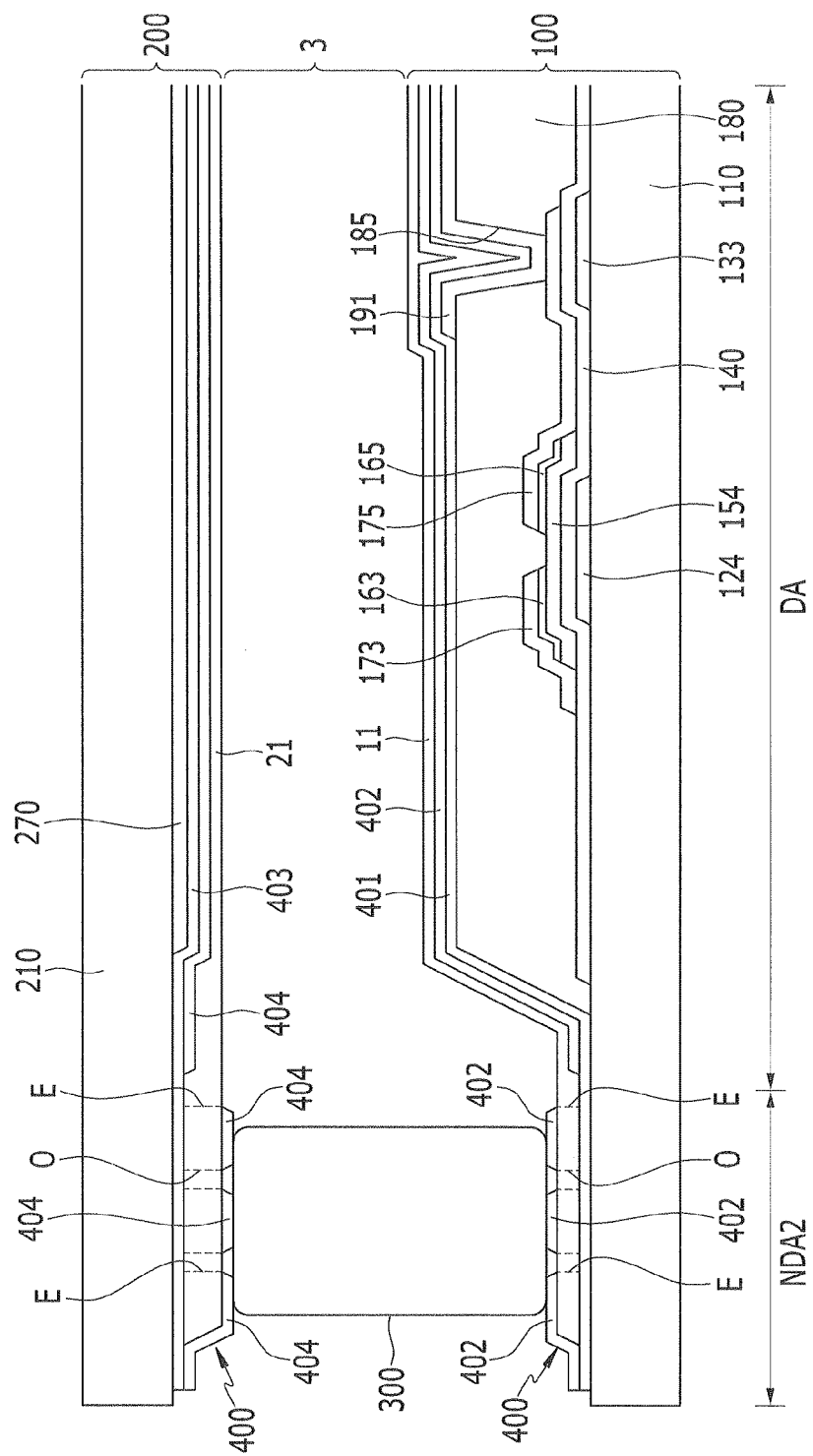
FIG. 13 is a cross-sectional view of FIG. 12 taken along the line XIII-XIII

FIG. 13 is a cross-sectional view of FIG. 12 taken along the line XIII-XIII

Differences FIGS. 12 and 13 and FIGS. 2 and 3 will be described.

A detailed description will be omitted since a structure of the display area DA is the same as that described in FIG. 3, so lower and upper panels 100 and 200 in the second display area NDA2 will be described.

In reference to FIGS. 12 and 13, a plurality of aligning agent-accommodating structures 400 are provided to be arranged in a plurality of columns along the second non-display area NDA2.

Each aligning agent-accommodating structure 400 includes a first aligning agent-accommodating structure 410 disposed at the outermost side of the liquid crystal panel assembly 1500, and a second aligning agent-accommodating structure 420 not disposed at the outermost side of the liquid crystal panel assembly 1500.

The first aligning agent-accommodating structure 410 is formed to have a spatial structure having an aligning agent-accommodating entrance E that is opened toward the display area DA.

In a lower panel 100, a first insulating layer 401 is disposed on a first substrate 110.

The first insulating layer 401 may be omitted.

A second insulating layer 402 is disposed on the first insulating layer 401.

A plurality of capping layers are formed by the second insulating layer 402 such that they are spaced apart from the first substrate 110 to interpose gaps therebetween.

Among the plurality of capping layers, the capping layer disposed at the outermost side forms the first aligning agent-accommodating structure 410.

One side of the first aligning agent-accommodating structure 410, which is farther from the display area DA, is closed.

Accordingly, the aligning agent is prevented from leaking outside of the second non-display area NDA2, that is, outside of the liquid crystal panel assembly 1500.

The second aligning agent-accommodating structure 420 is formed to have a spatial structure including an aligning agent-accommodating entrance E opened toward the display area DA and an aligning agent-accommodating outlet O opened toward the first aligning agent-accommodating structure 410.

In the lower panel 100, among the plurality of capping layers formed by the second insulating layer 402, the capping layer not disposed at the outermost side forms the second aligning agent-accommodating structure 420.

Since the second aligning agent-accommodating structure 420 has the aligning agent-accommodating outlet O, the aligning agent accommodated in the aligning agent-accommodating entrance E is not prevented from spilling over to the second aligning agent-accommodating structure 420 and is allowed to flow into another second aligning agent-accommodating structure 420 or the first aligning agent-accommodating structure 410.

In the upper panel 200, since the first and second aligning agent-accommodating structures 410 and 420 can be formed in the same way as that of the lower panel 100, a detailed description thereof will be omitted.

A manufacturing method of the plurality of aligning agent-accommodating structures 400 that are disposed in the plurality of columns along the second non-display area NDA2 differs from the manufacturing method described in FIGS. 4 through 9 in that it has only a different number of aligning agent-accommodating structures 400, so they can be manufactured by using the same method.

Hereinafter, a structure for improving structural stability of the aligning agent-accommodating structure 400 will be described with reference to FIGS. 14 through 16, and a manufacturing method thereof will be described with reference to FIGS. 17 through 21.

For ease of description, an aligning agent-accommodating structure 400 of the lower panel 100 will be exemplarily described.

Figure 14:
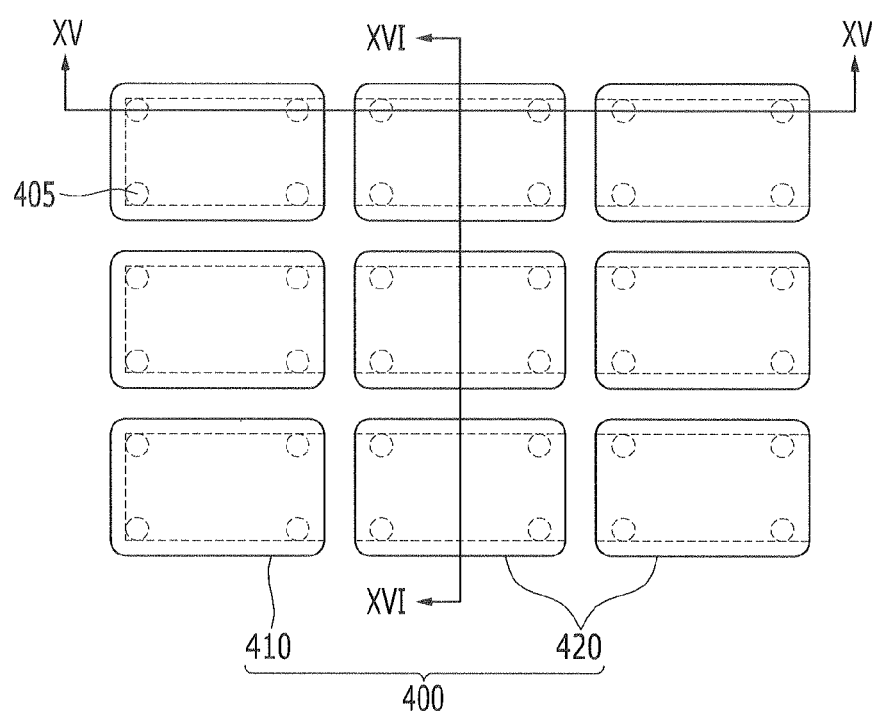
FIG. 14 is a top plan view of an aligning agent-accommodating structure according to a further exemplary embodiment of the present invention.

FIG. 14 is a top plan view of an aligning agent-accommodating structure according to a further exemplary embodiment of the present invention.

Figure 15:
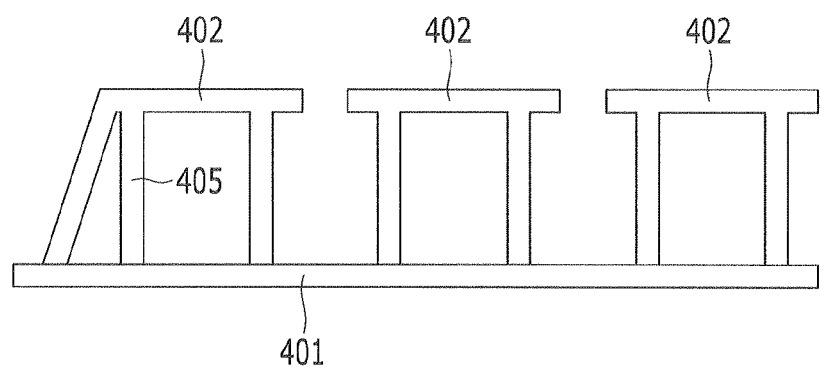
FIG. 15 is a cross-sectional view of FIG. 14 taken along the line XV-XV.

FIG. 15 is a cross-sectional view of FIG. 14 taken along the line XV-XV.

Figure 16:
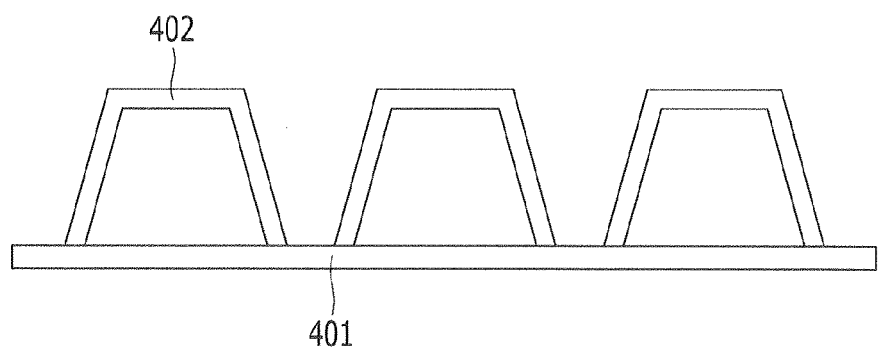
FIG. 16 is a cross-sectional view of FIG. 14 taken along the line XVI-XVI.

FIG. 16 is a cross-sectional view of FIG. 14 taken along the line XVI-XVI.

In reference to FIGS. 14 through 16, compared with the aligning agent-accommodating structure 400 of FIG. 12, each aligning agent-accommodating structure 400 includes one or more support portions 405.

As illustrated, first and second aligning agent-accommodating structures 410 and 420 may respectively include four support portions 405.

The support portions 405 support a capping layer that is formed by a second insulating layer 402.

The support portions 405 are integrally formed when forming the second insulating layer 402.

That is, the support portions 405 may be formed of the same material as the second insulating layer 402.

FIGS. 17 through 21 are cross-sectional views for illustrating a manufacturing method of the aligning agent-accommodating structure of FIG. 14.

Figure 17:
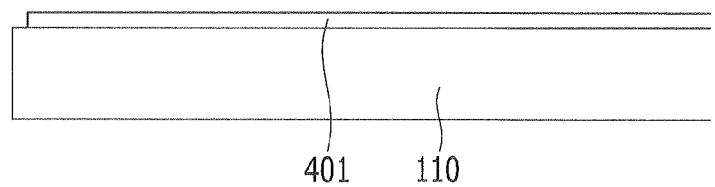
FIGS. 17 to 21 are cross-sectional views for illustrating a manufacturing method of the aligning agent-accommodating structure of FIG. 14.

In reference to FIG. 17, in a non-display area NDA2, a first insulating layer 401 is formed on a first substrate 110.

The first insulating layer 401 may be formed in a display area DA and the second non-display area NDA2 after a thin film transistor, a passivation layer 180, a pixel electrode 191, etc. of the display area DA are formed.

A process of forming the first insulating layer 401 may be omitted.

Figure 18:
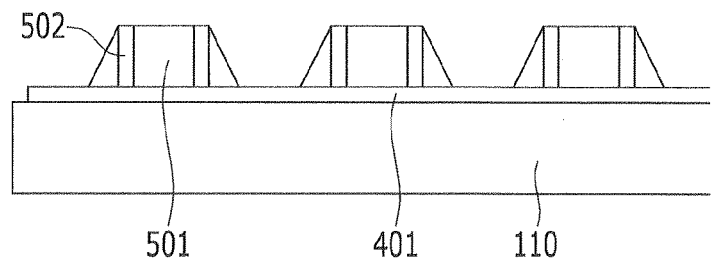

In reference to FIG. 18, a sacrificial layer 501 is formed in the second non-display area NDA2.

The sacrificial layer 501 may be formed by coating a photoresist on the first insulating layer 401 and then performing a photolithography process.

A hole 502 is formed to expose the first insulating layer 401 at a position where the support portion 405 is to be formed in the photolithography process.

That is, the sacrificial layer 501 includes the hole 502 for exposing the first insulating layer 401.

The hole 502 may be formed in a number corresponding to the number of support portions 405 that are included in the aligning agent-accommodating structure 400.

Figure 19:
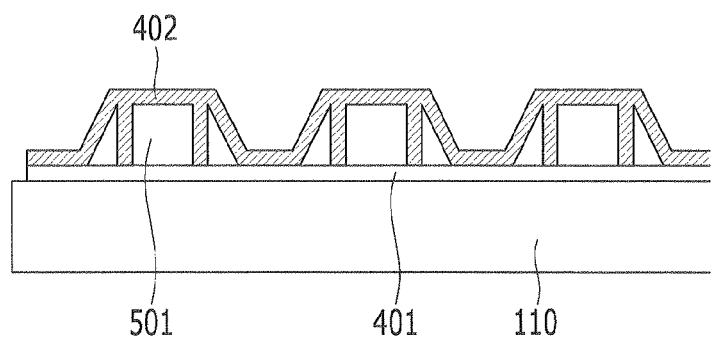

In reference to FIG. 19, the sacrificial layer 501 is formed and the second insulating layer 402 is then formed in the display area DA and the second non-display area NDA2.

An inorganic insulating material such as a silicon oxide ($SiO_x$), a silicon nitride ($SiN_x$), etc. may be used to form the first and second insulating layers 401 and 402.

Alternatively, various kinds of organic insulating materials may be used to form the first and second insulating layers 401 and 402.

When the second insulating layer 402 is formed of an insulating material, the hole 502 formed in the sacrificial layer 501 is filled with the insulating material.

The insulating material filled in the hole 502 forms the support portions 405.

Figure 20:
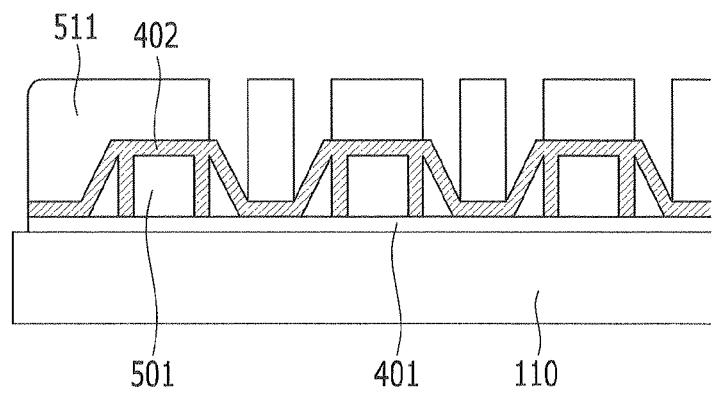

In reference to FIG. 20, after the second insulating layer 402 is formed, the photosensitive film pattern 511 for forming an aligning agent-accommodating entrance E and an aligning agent-accommodating outlet O is formed on the second insulating layer 402.

The photosensitive film pattern 511 may be formed by coating the photoresist on the second insulating layer 402 and then performing a photolithography process.

The photosensitive film pattern 511 is formed to partially expose the second insulating layer 402 where the aligning agent-accommodating entrance E and the aligning agent-accommodating outlet O are to be formed.

Figure 21:
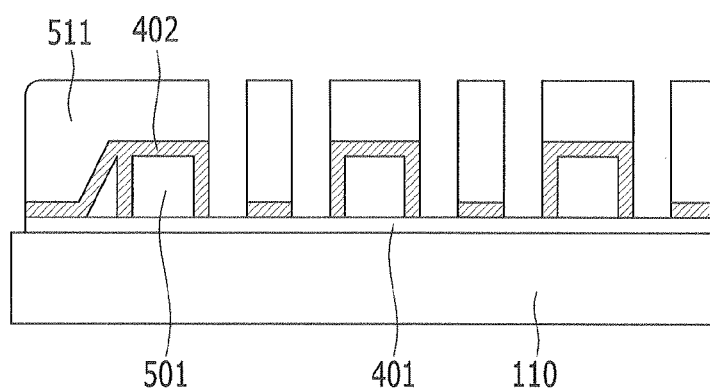

In reference to FIG. 21, the second insulating layer 402 is etched by an etching process using the photosensitive film pattern 511 as a mask to be exposed.

The exposed second insulating layer 402 is etched to be removed, thereby forming the aligning agent-accommodating entrance E and the aligning agent-accommodating outlet O.

Then, when the photosensitive film pattern 511 and the sacrificial layer 501 are removed by using a photoresist strip method, the aligning agent-accommodating structure 400 described in FIG. 15 can be formed.

The accompanying drawings and the detailed description of the invention are only illustrative, and are used for the purpose of describing the present invention, but are not used to limit the meanings or scope of the present invention described in the claims.

Therefore, those skilled in the art will understand that various modifications and other equivalent embodiments of the present invention are possible.

Consequently, the true technical protective scope of the present invention must be determined based on the technical spirit of the appended claims.

DESCRIPTION OF SYMBOLS

400: aligning agent-accommodating structure
401: first insulating layer
402: second insulating layer
403: third insulating layer
404: fourth insulating layer
405: support portion

What is claimed is:

1. A display device comprising:
a display substrate including a display area including a plurality of pixel areas and a non-display area disposed at edge sides of the display area;
a first aligning agent-accommodating structure including a capping layer disposed in the non-display area, the first aligning agent-accommodating structure having, on one side, a closed end facing away from the display area and having, on an opposite side, an entrance facing toward the display area, the entrance being spaced apart from the closed end; and
an aligning agent formed over the non-display area and the display area, the aligning agent extending through the entrance to make contact with the closed end of the first aligning agent-accommodating structure.

2. The display device of claim 1, wherein:
the first aligning agent-accommodating structure includes:
a first insulating layer disposed on the display substrate; and
a second insulating layer, forming the capping layer, spaced apart from the display substrate to interpose a gap between the first and second insulating layers, the gap accommodating the aligning agent.

3. The display device of claim 1, further comprising:
a facing substrate facing the display substrate, and
a second aligning agent-accommodating structure disposed on the facing substrate.

4. The display device of claim 3, further comprising a sealing member disposed between the first and second aligning agent-accommodating structures.

5. The display device of claim 3, wherein at least either one of the first and second aligning agent-accommodating structures is provided in a plural number to be arranged in one line along the non-display area.

6. The display device of claim 1, wherein
the first aligning agent-accommodating structure includes at least one support portion for supporting the capping layer.

7. A display device comprising:
a display substrate;
a facing substrate facing the display substrate; and
an aligning agent-accommodating structure disposed on either one of the display substrate and the facing substrate in a non-display area, the aligning agent-accommodating structure having, on one side, a closed end facing away from a display area and having, on an opposite side, an entrance facing toward the display area, the entrance being spaced apart from the closed end; and
an aligning agent extending through the entrance and making contact with the closed end of the aligning agent-accommodating structure.

8. The display device of claim 7, further comprising an aligning agent-blocking dam disposed on the other one of the display substrate and the facing substrate to face the aligning agent-accommodating structure.

9. The display device of claim 8, wherein the aligning agent-blocking dam is extended along the non-display area.

10. The display device of claim 9, further comprising a sealing member disposed between the aligning agent-accommodating structure and the aligning agent-blocking dam.

11. The display device of claim 7, wherein the aligning agent-accommodating structure is provided in a plural number to be arranged in a plurality of columns along the non-display area.

12. The display device of claim 11, wherein the aligning agent-accommodating structure includes:
a first alignment structure disposed at an outermost side of the non-display area; and
a second alignment structure disposed at an innermost side of the non-display area, between the display area and the first alignment structure.

13. The display device of claim 12, wherein the first alignment structure has a spatial structure having the entrance.

14. The display device of claim 13, wherein the second alignment structure has a spatial structure having an aligning agent-accommodating entrance opened toward the display area and an aligning agent-accommodating outlet opened toward the entrance of the first alignment structure.

15. A manufacturing method of a display device comprising steps of:
forming on a display substrate, including a display area and a non-display area disposed at edges on sides of the display area, a sacrificial layer in the non-display area;
forming a capping layer on the sacrificial layer;
forming an aligning agent-accommodating entrance in the capping layer to partially expose the sacrificial layer; and
forming a gap between the display substrate and the capping layer by removing the sacrificial layer.

16. The manufacturing method of claim 15, further comprising a step of:
forming a bottom layer on the display substrate before forming the sacrificial layer.

17. The manufacturing method of claim 16, further comprising a step of:
forming a photosensitive film pattern for forming the aligning agent-accommodating entrance on the capping layer.

18. The manufacturing method of claim 17, wherein the capping layer is partially removed through an etching process using the photosensitive film pattern as a mask to form the aligning agent-accommodating entrance.

19. The manufacturing method of claim 15, wherein the sacrificial layer includes a hole for forming a support portion for supporting the capping layer.

* * * * *